(12) United States Patent
Sano

(10) Patent No.: US 7,677,850 B2
(45) Date of Patent: Mar. 16, 2010

(54) CLIP COMPRISING A PIN AND A BUSH

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 177 days.

(21) Appl. No.: 11/755,353

(22) Filed: May 30, 2007

(65) Prior Publication Data

US 2007/0294865 A1 Dec. 27, 2007

(30) Foreign Application Priority Data

Jun. 1, 2006 (JP) .............................. 2006-153729

(51) Int. Cl.
*F16B 13/06* (2006.01)
(52) U.S. Cl. ..................... 411/45; 411/42; 411/540; 16/2.1
(58) Field of Classification Search ................... 411/41, 411/45–48, 49–51, 57.1, 58
See application file for complete search history.

(56) References Cited

U.S. PATENT DOCUMENTS

| | | | | |
|---|---|---|---|---|
| 3,918,130 A * | 11/1975 | Poe | ............................... | 24/453 |
| 4,405,272 A * | 9/1983 | Wollar | ........................... | 411/41 |
| 5,028,187 A * | 7/1991 | Sato | .............................. | 411/48 |
| 5,201,623 A * | 4/1993 | Benedetti et al. | ............... | 411/48 |
| 5,211,519 A * | 5/1993 | Saito | ............................. | 411/45 |
| 5,290,137 A * | 3/1994 | Duffy, Jr. | .................... | 411/80.1 |
| 5,370,484 A * | 12/1994 | Morikawa et al. | .............. | 411/48 |
| 5,375,954 A * | 12/1994 | Eguchi | .......................... | 411/48 |
| 5,387,065 A * | 2/1995 | Sullivan | ....................... | 411/48 |
| 5,632,581 A * | 5/1997 | Hasada | .......................... | 411/48 |
| 5,641,255 A * | 6/1997 | Tanaka | .......................... | 411/48 |
| 5,775,860 A * | 7/1998 | Meyer | ........................... | 411/46 |
| 6,048,147 A * | 4/2000 | Arisaka et al. | ................. | 411/48 |
| 6,364,586 B1 * | 4/2002 | Okada | ........................... | 411/41 |
| 6,481,942 B2 * | 11/2002 | Tanaka | .......................... | 411/45 |
| 6,514,023 B2 * | 2/2003 | Moerke | ......................... | 411/45 |
| 6,514,024 B2 * | 2/2003 | Akema et al. | .................. | 411/48 |

(Continued)

FOREIGN PATENT DOCUMENTS

JP 63-3513 1/1988

(Continued)

*Primary Examiner*—Victor Batson
*Assistant Examiner*—Roberta Delisle
(74) *Attorney, Agent, or Firm*—Stephen R. Valancius; Michael P. Leary

(57) ABSTRACT

A clip comprises a pin, and a hollow bush adapted to receive the pin therein. The bush includes a flange and a bush body having an opening which is formed by partially cutting off a peripheral wall thereof and adapted to receive therein a pin shank in a direction orthogonal to an axial direction of the bush body. The bush body and the bush flange are adapted to be expanded in a radially outward direction of the bush body about a position opposed to the opening, in a hinged manner. The pin has a shank that includes a protruding portion which has a narrow region formed near a distal end of the pin shank, causing no expansion in an outer diameter of the bush body in the radially outward direction when the pin is in a non-fastened position, and a wide region adjacent to the bush flange, causing an expansion in the outer diameter of the bush body when the pin is in a fastened position.

10 Claims, 11 Drawing Sheets

U.S. PATENT DOCUMENTS

| | | | |
|---|---|---|---|
| 6,726,417 B2* | 4/2004 | Kanie | 411/48 |
| 6,769,849 B2* | 8/2004 | Yoneoka | 411/45 |
| 2002/0001513 A1* | 1/2002 | Tanaka | 411/45 |
| 2002/0094253 A1* | 7/2002 | Enomoto et al. | 411/41 |
| 2003/0129040 A1* | 7/2003 | Arisaka | 411/41 |
| 2003/0143053 A1* | 7/2003 | Kanie | 411/45 |
| 2004/0175250 A1* | 9/2004 | Yoneoka | 411/45 |

FOREIGN PATENT DOCUMENTS

| | | |
|---|---|---|
| JP | 11-153113 | 6/1999 |
| JP | 2003-343528 | 3/2003 |

* cited by examiner (A)

(B)

CLIP COMPRISING A PIN AND A BUSH

CROSS-REFERENCE TO RELATED APPLICATION

This application claims the benefit of Japanese Patent Application 2006-153729 filed Jun. 1, 2006, incorporated herein by reference.

BACKGROUND OF THE INVENTION

The present invention relates to a plastic clip which comprises a pin, and a bush adapted to receive the pin therein and allow an outer diameter thereof to be expanded by pushing the pin into the bush, and more specifically to a plastic clip suitable for coupling an attachment component to a workpiece, such as a panel of an automobile body.

There has been known a plastic clip comprising a pin, and a bush having a hollow portion formed to receive the pin therein, wherein the pin has a shape formed to be received into the hollow portion of the bush and axially moved from a non-fastened position, causing no expansion in an outer diameter of the bush, to a fastened position, causing an expansion in the outer diameter of the bush by a pushing operation. For example, Japanese Utility Model Laid-open Publication No 63-003513 (Patent Document 1) discloses a clip of the above type. This clip is designed such that, when a large-diameter portion of a pin is inserted into a bush by a pushing operation, a peripheral wall of the bush is expanded in a radially outward direction of the bush to allow a workpiece and an attachment component to be clamped between the expanded portion and a flange of the bush, so as to achieve a coupling between the workpiece and the attachment component. The clip disclosed in Patent Document 1 is designed to cope with an increase in total thickness of a workpiece and an attachment component to be coupled together, and to allow the pin to be moved within the bush from a fastened position to a non-fastened position, so as to facilitate detaching the clip.

Japanese Patent Laid-Open Publication No. 11-153113A (Patent Document 2) discloses another clip which comprises a bush having a peripheral wall formed with a large opening and a hollow portion formed along an axis thereof, and a pin having a head formed in a particular shape to serve as an expanding portion. When the expanding portion at the head of the pin is inserted into the bush by a pushing operation, the peripheral wall with the opening is expanded in a radially outward direction of the bush to allow a workpiece and an attachment component to be clamped between the expanded portion and a flange of the bush, so as to achieve a coupling between the workpiece and the attachment component. The clip disclosed in the Patent Document 2 is designed to allow the bush to be largely expanded so as to cope with an increase in diameter of a mounting hole.

Japanese Patent Laid-Open No. 2003-343528A (Patent Document 3) discloses yet another clip which comprises a bush having a peripheral wall formed to be partially cut off and a hollow portion formed along an axis thereof, and a pin adapted to be inserted into the hollow portion. When the pin is inserted into the bush by a pushing operation, the peripheral wall is expanded around the cutoff in a radially outward direction of the bush to allow a workpiece and an attachment component to be clamped between the expanded portion and a flange of the bush, so as to achieve a coupling between the workpiece and the attachment component.

The clip disclosed in Patent Document 1 is designed to expand an outer diameter of the bush over the entire longitudinal length of the bush, so as to cope with an increase in total thickness of a workpiece and an attachment component to be coupled together. Thus, it is necessary to have a relatively long bush, which is unfavorable in a situation where a fastened position has to be set in a narrow range in the longitudinal direction. In the clip disclosed in the Patent Document 2, the pin has the head formed in a particular shape, increasing the cost of forming the pin. Moreover, the pin and the bush in the clip disclosed in the Patent Document 2 are not designed to be pre-assembled to one another, and therefore a fastening operation has to be performed while paying attention to preventing the pin and the bush from separating from one another, resulting in poor operating efficiency. Further, as with the clip disclosed in Patent Document 1, this clip is designed to expand an outer diameter of the bush over the entire longitudinal length of the bush, and therefore it is necessary to have a relatively long bush, which is unfavorable in the situation where the fastened position has to be set in a narrow range in the longitudinal direction. The clip disclosed in the Patent Document 3 is not designed to largely and reliably expand an intended portion of the bush, and therefore deterioration in coupling force between the workpiece and the attachment component is likely. Moreover, due to difficulty in reliably expanding an intended portion of the bush, the clip disclosed in Patent Document 3 is required to have a relatively long bush, which is unfavorable in the situation where the fastened position has to be set in a narrow range in the longitudinal direction.

BRIEF DESCRIPTION OF THE INVENTION

It is therefore an object of the present invention to provide a clip capable of reducing a longitudinal length of a bush while allowing an intended portion of the bush to be largely and reliably expanded, so as to cope adequately with the need for setting a fastened position in a narrow range in a longitudinal direction of the bush, and performing a fastening operation in a state after a pin is pre-assembled to the bush.

The present invention provides a plastic clip which comprises a pin, and a bush having a hollow portion formed to receive the pin therein, wherein the pin is adapted to be received in the hollow portion of the bush in a non-fastened position, causing no expansion in an outer diameter of the bush, and then moved from the non-fastened position to a fastened position, causing an expansion in the outer diameter of the bush, by a pushing operation in an axial direction of the bush.

In an embodiment of the above clip, the pin includes a pin shank adapted to be housed in the hollow portion of the bush, and a pin flange formed at one end of the pin shank, and the bush includes a generally annular-shaped bush body having the hollow portion formed to receive the pin shank therein, and a bush flange formed at one end of the bush body. The pin and the bush are adapted to be pre-assembled to one another in such a manner that the pin shank is housed in the bush body. The bush body has an opening which is formed by partially cutting off a peripheral wall thereof and adapted to receive therein the pin shank in a direction orthogonal to an axial direction of the bush body. A thin-walled portion is formed at a position opposed to the opening in a circumferential direction of the bush body. Two rigid semi cylindrical portions are formed on opposite sides of the thin-walled portion in the circumferential direction, respectively, and two semicircular discs are formed at first ends of the semi cylindrical portions, respectively, to serve as the bush flange.

The pin shank has a rod portion adapted to be housed in the hollow portion of the bush body and held within the bush body after the pin is pre-assembled to the bush, and a protruding portion formed on an outer peripheral surface of the rod portion in such a manner as to extend in a longitudinal direction of the rod portion, and to protrude in a radially outward direction of the bush body to close the opening in the pre-assembled state. The protruding portion includes a narrow region which is formed on the side of the other, distal, end of the pin shank to have a first, relative small circumferential length, and adapted to close the opening in such a manner as to cause no expansion in an outer diameter of the bush body when the pin is in the non-fastened position, and a wide region which is formed on the side adjacent to the bush flange to have a second, relatively large circumferential length and adapted to close the opening which is enlarged to cause an expansion in the outer diameter of the bush body when the pin is in the fastened position.

According to this embodiment of the clip of the present invention, the pin is forcibly inserted into the opening in a direction orthogonal to the axial direction of the bush so as to be pre-assembled to the bush in the non-fastened position. A fastening operation can be performed after the pin is pre-assembled to the bush. By axially pushing the pin, the wide region of the protruding portion of the pin shank enlarges the opening of the bush body to expand the entire bush body in a radially outward direction. A longitudinal length of the entire bush can be reduced while allowing an intended portion of the bush body to be largely and reliably expanded, so as to cope adequately with the need for setting the fastened position in a narrow range in a longitudinal direction of the bush.

In the above embodiment of the clip, the rod portion of the pin shank may include: a small-diameter region which is formed on the side of the other, distal end of the pin shank and in corresponding relation to the narrow region of the protruding portion, and adapted to be housed in the hollow portion of the bush body in such a manner as to cause no expansion in the outer diameter of the bush body when the pin is in the non-fastened position; a first large-diameter region which is formed on the side adjacent to the bush flange and in corresponding relation to the wide region of the protruding portion, and adapted to cause an expansion in the outer diameter of the bush body when the pin is in the fastened position; and a second large-diameter region which is formed on the side of the distal end of the pin shank to have a diameter greater than an inner diameter of the bush body when the pin is in the non-fastened position, and adapted to prevent the pin from being pulled out of the bush body when the small-diameter region is housed in the hollow portion.

The protruding portion of the pin shank may have a taper region which extends from the narrow region to the wide region while gradually increasing a circumferential length thereof from the first circumferential length to the second circumferential length, and the rod portion may have a taper region which extends from the small-diameter region to the first large-diameter region while gradually increasing a diameter thereof.

Further, the above clip may include stop means which is provided between an outer surface of the first large-diameter region of the rod portion of the pin shank and an inner surface of the bush body, and adapted to prevent the pin shank from being pulled out of the bush body in a radially outward direction when the pin is in the fastened position relative to the bush, so as to keep the pin in the fastened position.

The clip of the present invention may include first and second latch means provided between an outer surface of the pin shank and an inner surface of the bush body, wherein the first latch means is adapted to keep the pin in the non-fastened position relative to the bush, and the second latch means is adapted to keep the pin in the fastened position relative to the bush.

In the clip of the present invention, the bush body may have an engagement portion which is formed at the other, distal, end thereof to protrude in the radially outward direction, and adapted to be engaged with a peripheral edge defining a mounting hole of a workpiece to which the clip is fastened.

The clip of the present invention may be designed to couple an attachment component to a workpiece in such a manner that the bush body is inserted into respective aligned mounting holes of the attachment component and the workpiece, and the pin shank is moved from the non-fastened position to the fastened position by a pushing operation to expand the outer diameter of the bush body so as to allow the attachment component and the workpiece to be clamped between the expanded bush body and the bush flange.

In this clip, the bush body may have an axial length which is greater than a total thickness of the attachment component and the workpiece, and less than a distance (i.e., clearance) between the workpiece and an additional member coupled to the workpiece on the opposite side of the attachment component.

In the clip of the present invention, the pin flange may be formed to have a size entirely overlapping with the bush flange, wherein the clip is designed to position the pin flange adjacent to the bush flange when the pin is in the fastened position, and then allow an elongated member to be forcibly inserted into the opening so as to move the pin flange away from the bush flange to move the pin to the non-fastened position.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
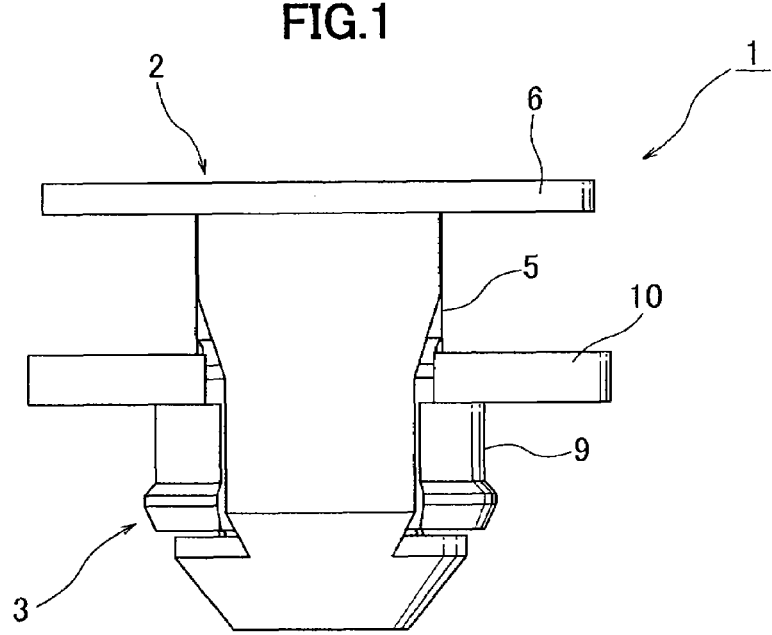
FIG. 1 is a left side view of a clip according to one embodiment of the present invention.
Figure 2:
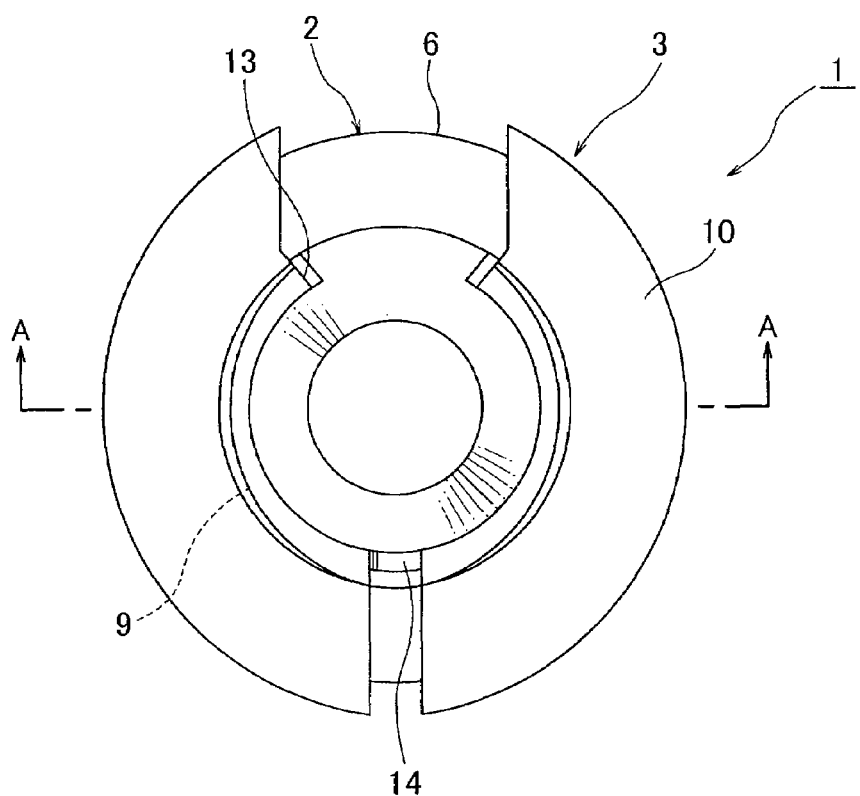
FIG. 2 is a bottom view of the clip in FIG. 1.
Figure 3:
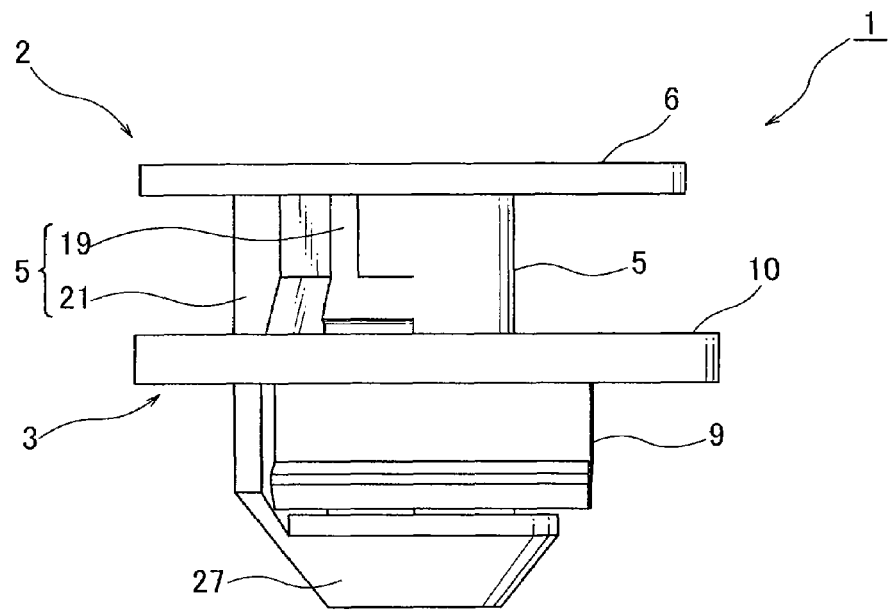
FIG. 3 is a front view of the clip in FIG. 1.
Figure 4:
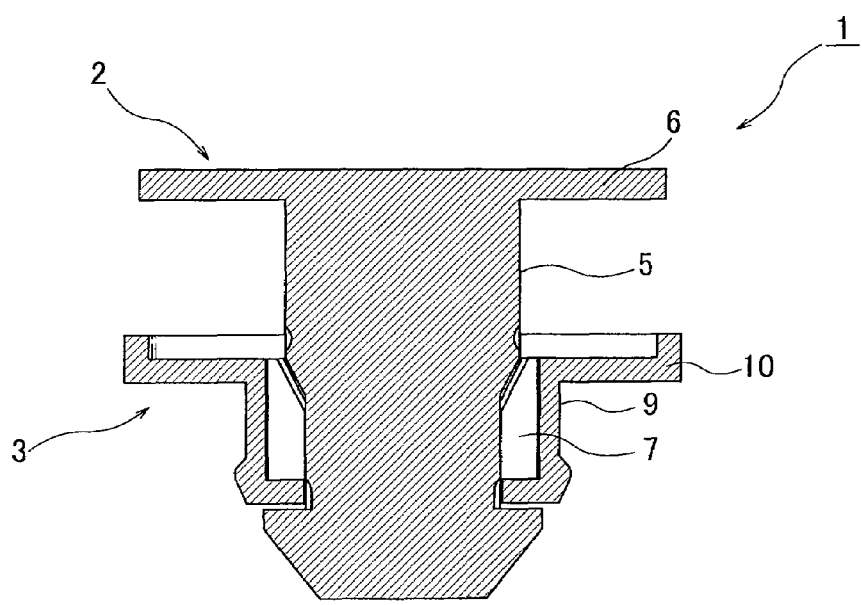
FIG. 4 is a sectional view taken along the line A-A of the clip in FIG. 1.
Figure 5:
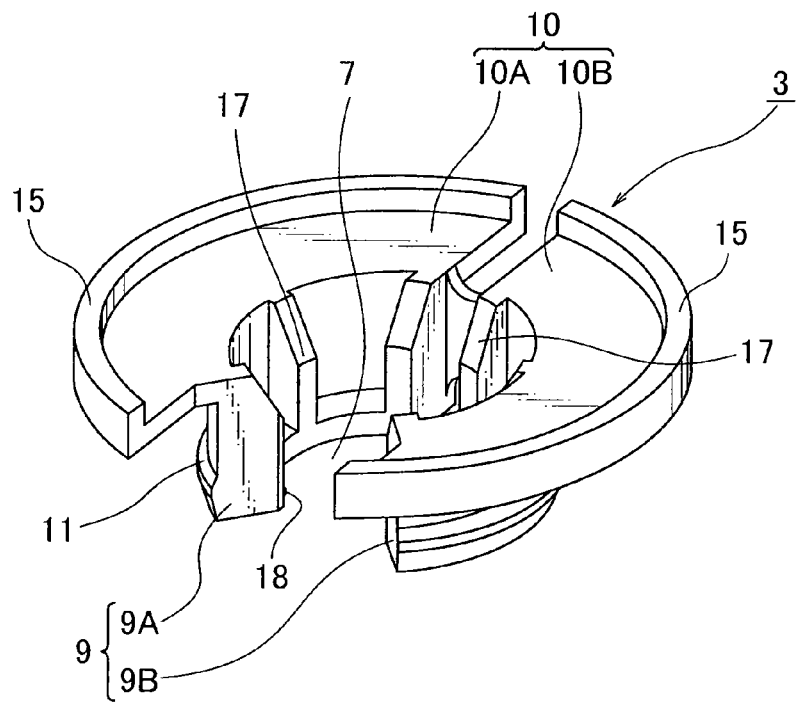
FIG. 5 is a perspective view of a bush of the clip in FIG. 1, as viewed from the top side of the bush.

In reference to the drawings, a clip 1 according to one embodiment of the present invention will now be described. As shown in FIGS. 1 to 4, the clip 1 comprises a pin 2 and a bush 3 which are pre-assembled to one another. The pin 2 is made of a hard plastic and formed by an integral molding process, and the bush 3 is made of a hard plastic and formed by an integral molding process. The pin 2 includes a pin shank 5, and a pin flange 6 formed at a first end (upper end in FIGS. 1, 3 and 4) of the pin shank 5. The bush 3 includes a generally annular-shaped bush body 9 having a hollow portion 7 formed to receive the pin shank 5 of the pin 2, and a bush flange 10 formed at a first end (upper end in FIGS. 1, 3 and 4) of the bush body 9. The pin 2 is adapted to be received in the hollow portion 7 of the bush body 9 of the bush 3 so as to be pre-assembled in a non-fastened position, causing no expansion in an outer diameter of the bush body 9, and then moved from the non-fastened position to a fastened position, causing an expansion in the outer diameter of the bush body 9, by a pushing operation in an axial direction of the bush (downward direction in FIGS. 1, 3 and 4). FIGS. 1 to 4 show the clip in a state after the pin 2 is pre-assembled to the bush 3 in the non-fastened position. The structure of the bush 3 is more specifically illustrated in FIGS. 5 to 8. The structure of the pin 2 is more specifically illustrated in FIGS. 9 to 12.

With reference to FIGS. 5 to 8, the bush 3 will be specifically described below. The bush 3 has the generally annular-shaped bush body 9 having the hollow portion 7 formed to receive the pin shank 5, the bush flange 10 formed at the first end (upper end in FIGS. 5, 7 and 9) of the bush body 9, and an engagement portion 11 formed at a second, distal end (lower end in FIGS. 5, 7 and 9) of the bush body 9 to protrude in a radially outward direction of the bush body 9, and adapted to be engaged with a peripheral edge defining a mounting hole of a workpiece. The bush body 9 has an opening 13 which is formed by partially cutting off a peripheral wall thereof and adapted to receive therein the pin shank 5 of the pin 2 in a direction orthogonal to an axial direction of the bush body 9. Further, the bush body 9 has a flexible thin-walled portion 14 formed at a position opposed to the opening 13 in a circumferential direction of the bush body 9, and two rigid semi cylindrical portions 9A and 9B formed on opposite sides of the thin-walled portion 14 in the circumferential direction, respectively. The bush flange 10 is made up of two semicircular discs 10A and 10B formed at first ends of the semi cylindrical portions 9A, 9B in an integral manner, respectively. Each of the semicircular discs 10A, 10B has a peripheral edge formed with an edge wall 15 extending upwardly to define a concave portion for receiving the pin flange 6.

The thin-walled portion 14 has a wall thickness less than that of each of the semi cylindrical portions 9A, 9B, a relatively short circumferential length, and an axial (i.e. longitudinal) length slightly less than that of each of the semi cylindrical portions 9A, 9B. Thus, the thin-walled portion 14 has flexibility for serving as a hinge to allow the semi cylindrical portions 9A, 9B to be swingingly moved in a radially outward direction during the expansion in the outer diameter of the bush body 9, and resilience for maintaining the bush body 9 without an expansion in the outer diameter thereof before the pre-assembled state and when the pin 2 is in the non-fastened position.

Based on the resilience of the thin-walled portion 14, the bush body 9 can keep the inner diameter of the hollow portion 7 at a constant value. Further, in an operation of housing the pin shank 5 in the hollow portion, the pin shank 5 can move the semi cylindrical portions 9A, 9B in a radially outward direction by bending the thin-walled portion 14 so as to enlarge the opening 13 and expand the inner diameter of the hollow portion 7. Then, after the pin shank 5 is fully housed in the hollow portion 7, the semi cylindrical portions 9A, 9B can return to their original positions to allow the hollow portion 7 to have the original inner diameter.

As illustrated, the bush body 9 has a relatively thin peripheral wall to facilitate weight reduction, and has an inner surface formed with a plurality of ribs 17, each protruding in a radially inward direction of the bush body 9 and extending in the axial direction so as to maintain a certain level of strength. Among these ribs 17, a pair of ribs 17A (see FIG. 6) adjacent to the opening 13 serve as stop means provided on the inner surface of the bush body 9 and adapted to prevent the pin shank 5 from being pulled out of the bush body 9 in a radially outward direction when the pin 2 is in the fastened position relative to the bush 3, so as to keep the pin 2 in the fastened position.

Figure 6:
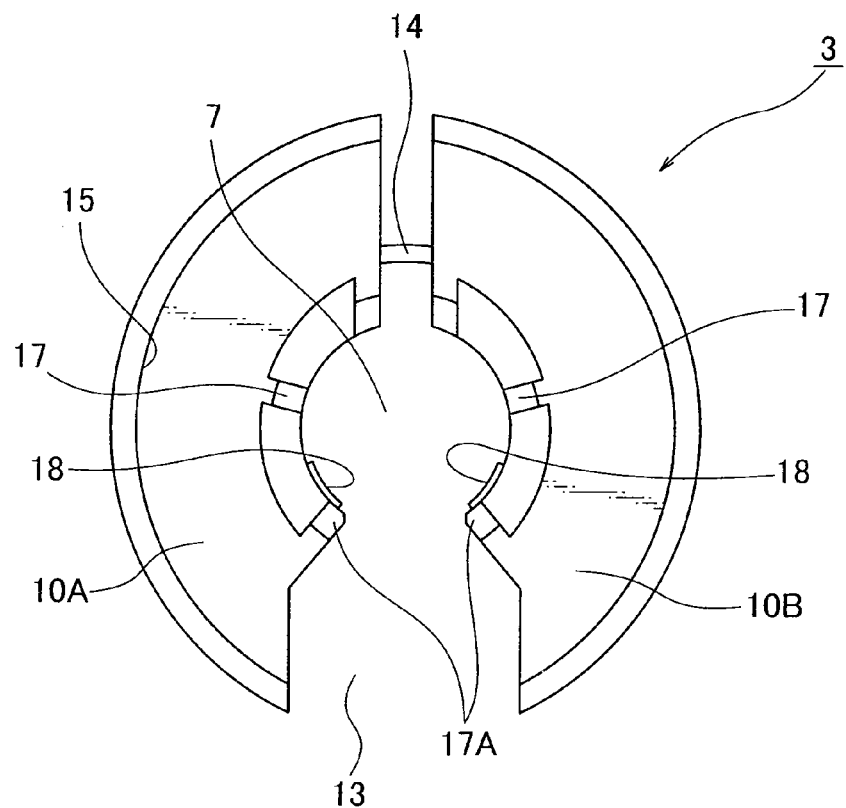
FIG. 6 is a top plan view of the bush in FIG. 5.
Figure 7:
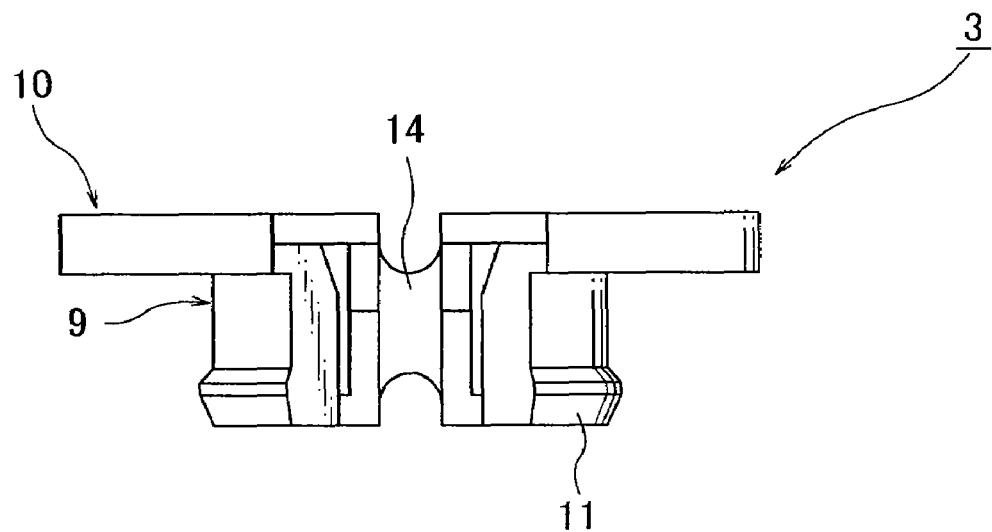
FIG. 7 is a front view of the bush in FIG. 5.
Figure 8:
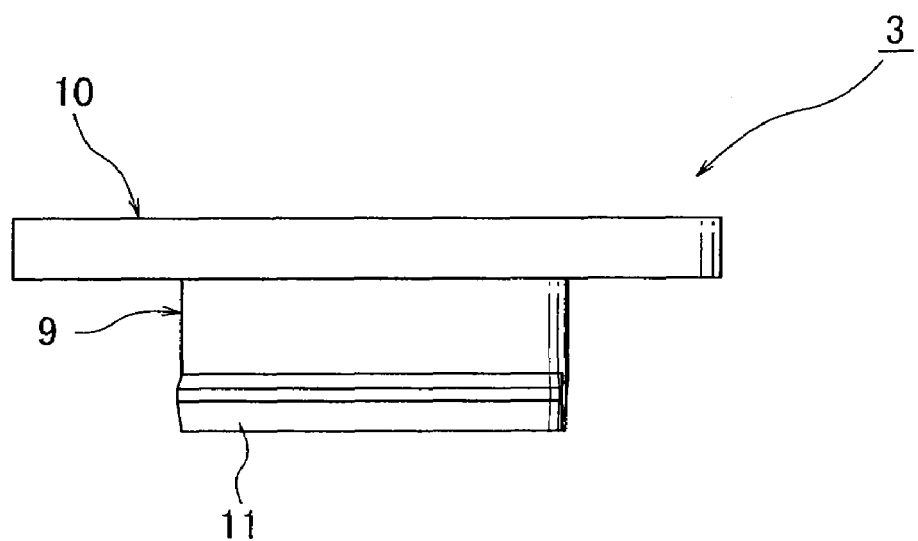
FIG. 8 is a right side view of the bush in FIG. 5.

Further, the inner surface of the bush body 9 is formed with a bead 18 protruding a radially inward direction and extending along a part of the peripheral wall in a circumferential direction to serve as first latch means for keeping the pin 2 in the non-fastened position relative to the bush 3, and second latch means for keeping the pin 2 in the fastened position relative to the bush 3. Preferably, there are two beads 18 at respective positions adjacent to the opening 13, as illustrated in FIG. 6. The bush body 9 has an axial length which is greater than a total thickness of a workpiece and an attachment component to be coupled together, and less than a clearance (i.e., distance) between the workpiece and an additional member, such as a reinforcing member, which is coupled to the workpiece.

With reference to FIGS. 9 to 12, the pin 2 will be specifically described below. The pin 2 includes the pin shank 5 adapted to be housed in the hollow portion 7 of the bush body 9, the pin flange 6 being formed at a first end (upper end in FIGS. 9, 11 and 12) of the pin shank 5. The pin shank 5 is formed so as to be axially moved between the non-fastened position, causing no expansion in the outer diameter of the bush body 9 of the bush 3, and the fastened position, causing an expansion in the outer diameter of the bush body 9. The pin shank 5 is adapted to be inserted into the opening 13 of the bush body 9 in a direction orthogonal to the axial direction of the bush body 9 so as to be pre-assembled to the bush body 9. In this pre-assembled state, the pin shank 5 is located in the non-fastened position, causing no expansion in the outer diameter of the bush body 9 of the bush 3. The pin shank 5 has a rod portion 19 adapted to be housed in the hollow portion 7 and held within the bush body 9 after the pin shank 5 is pre-assembled to the bush body 9, and a protruding portion 21 formed on an outer peripheral surface of the rod portion 19 in such a manner as to extend along the entire rod portion 19 in a longitudinal direction thereof, and to protrude in a radially outward direction to close the opening 13 in the pre-assembled state.

The protruding portion 21 includes a narrow region 22 which is formed on the side of a second, distal end of the pin shank 5 to have a first relatively-small circumferential length, and adapted to close the opening 13 in such a manner as to cause no expansion in the outer diameter of the bush body 9 when the pin 2 is in the non-fastened position relative to the bush 3, and a wide region 23 which is formed on the side of the pin flange 6 to have a second relatively-large circumferential length, and adapted to close the opening 13 which is enlarged to cause an expansion in the outer diameter of the bush body 9 when the pin 2 is in the fastened position.

The rod portion 19 includes: a small-diameter region 25 which is formed on the side of the distal end of the pin shank 5 and in corresponding relation to the narrow region 22 of the protruding portion 21, and adapted to be housed in the hollow portion 7 of the bush body 9 in such a manner as to cause no expansion in the outer diameter of the bush body 9 when the pin 2 is in the non-fastened position; a first large-diameter region 26 which is formed near the pin flange 6 and in corresponding relation to the wide region 23 of the protruding portion 21, adapted to cause an expansion in the outer diameter of the bush body 9 when the pin 2 is in the fastened position; and a second large-diameter region 27 which is formed on the side of the distal end of the pin shank 5 to have a diameter greater than an inner diameter of the hollow portion 7 of the bush body 9 when the pin 2 is in the non-fastened position, and adapted to prevent the pin 2 from being pulled out of the bush body 9 when the small-diameter region 25 is housed in the hollow portion 7.

Figure 12:
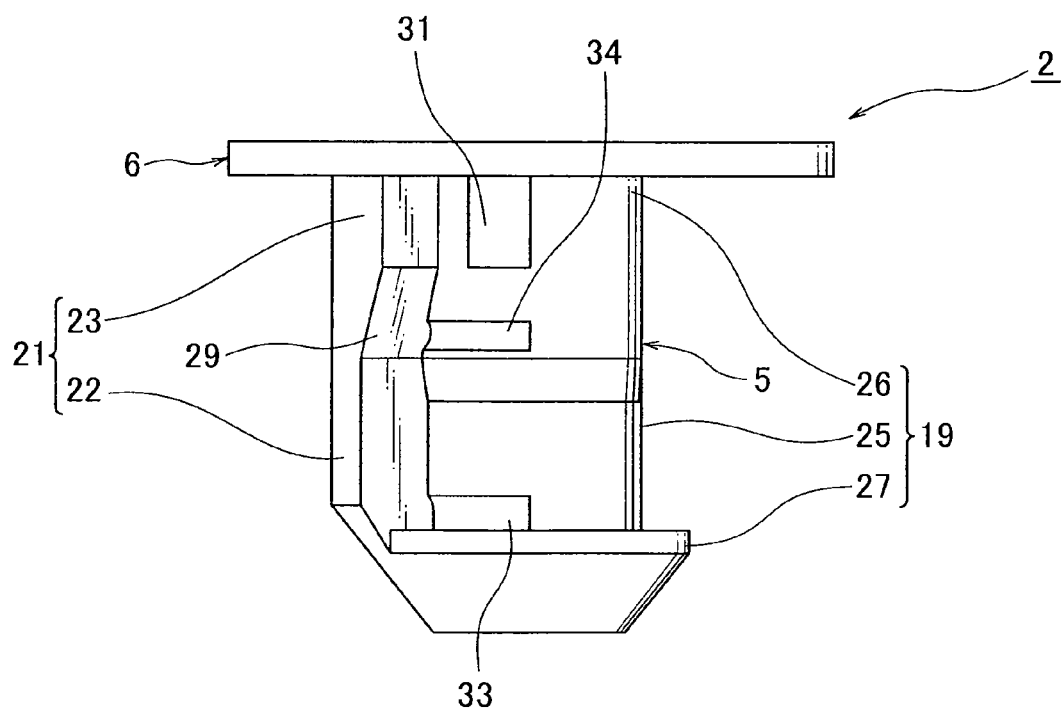
FIG. 12 is a front view of the pin in FIG. 9.

As shown in FIG. 12, the first large-diameter region 26 is not formed in a peripheral surface of the rod portion 19 on an opposite side of the protruding portion 21, because this surface is located opposed to the thin-walled portion 14 of the bush 3 where there is no need for expanding the outer diameter of the bush body 9. The protruding portion 21 of the pin shank 5 has a taper region 29 which extends from the narrow region 22 to the wide region 23 while gradually increasing a circumferential length thereof from the first circumferential length to the second circumferential length. The rod portion 19 also has a taper region 30 which extends from the small-diameter region 25 to the first large-diameter region 26 while gradually increasing a diameter thereof.

When the pin shank 5 is pushed into the bush body 9 in the axial direction, the opening 13 of the bush body 9 is closed by the wide region 23 instead of the narrow region 22, and the first large-diameter region 26 of the rod portion 10 is inserted into the hollow portion 7, instead of the small-diameter region 25. That is, the pin shank 5 is moved from the non-fastened position, causing no expansion in the outer diameter of the bush body 9, to the fastened position, causing an expansion in the outer diameter of the bush body 9.

Figure 9:
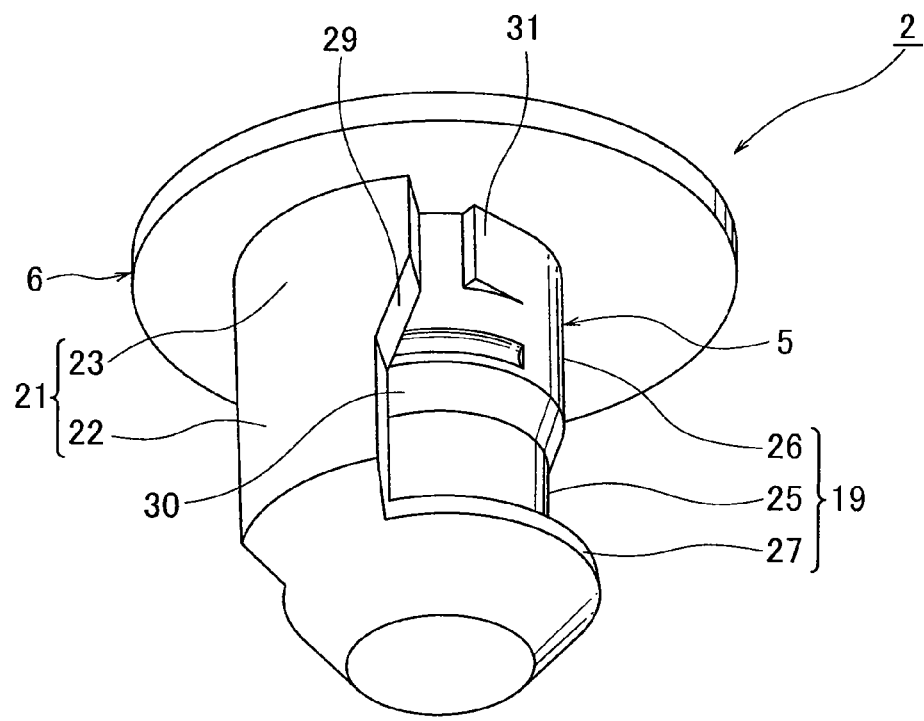
FIG. 9 is a perspective view of a pin of the clip in FIG. 1, as viewed from the bottom side of the pin.
Figure 10:
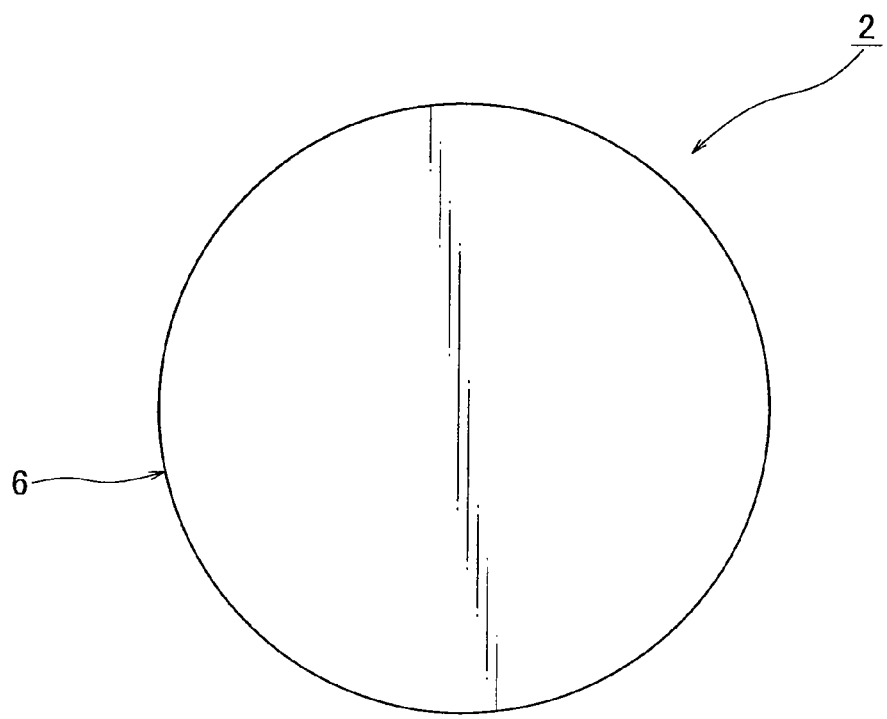
FIG. 10 is a top plan view of the pin in FIG. 9.
Figure 11:
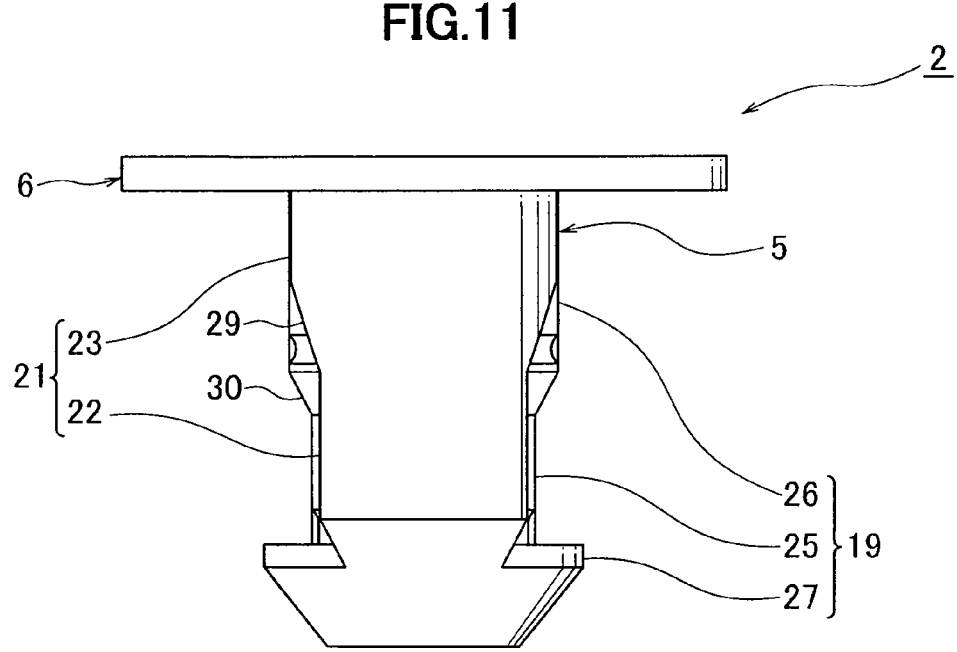
FIG. 11 is a right side view of the pin in FIG. 9.

The first large-diameter region 26 of the rod portion 19 of the pin shank 5 has an outer surface formed with a stop 31 which is adapted to prevent the pin shank 5 from being pulled out of the bush body 9 through the opening 13 in a radially outward direction when the pin 2 is in the fastened position relative to the bush 3, so as to keep the pin in the fastened position. Although only one stop 31 is illustrated in FIGS. 9 and 12, another stop is actually formed on a rear side of the illustrated surface of the rod portion 19. These stops 31 are arranged to come into contact with respective ribs 17 located adjacent to the opening 13 of the bush body 9.

The small-diameter region 25 of the rod portion 19 of the pin shank 5 is formed with a first groove 33 which serves as a first latch means adapted to receive therein a bead 18 (see FIG. 6) formed on the inner surface of the bush body 9 of the bush 3 so as to keep the pin 2 in the non-fastened position relative to the bush 3. The first large-diameter region 26 of the pin shank 5 is formed with a second groove 34 which serves as a second latch means adapted to receive therein a bead 18 of the bush body 9 so as to keep the pin 2 in the fastened position relative to the bush 3. Although only one first groove 33 and one second groove 34 are illustrated in FIGS. 9 and 12, another first groove and another second groove are actually formed on a reverse side of the illustrated surface of the rod portion 19. Each pair of the first and second grooves is arranged to receive therein the pair of beads 18 (see FIG. 6) of the bush body 9. The second large-diameter region 27 located at the distal end of the rod portion 19 of the pin shank 5 has an outer surface formed as a taper surface to facilitate an operation of inserting the pin shank 5 into respective aligned mounting holes of the attachment component and the workpiece.

The pin 2 and the bush 3 each having the above structure are pre-assembled to one another as shown in FIGS. 1 to 4. In a pre-assembling operation, the small-diameter region 25 of the rod portion 19 of the pin shank 5 of the pin 2 is forcibly inserted into the opening 13 of the bush body 9 of the bush 3 in a direction orthogonal to the axial direction of the bush 3. Thus, the opening 13 is enlarged to allow the small-diameter region 25 to be housed in the hollow portion 7. Just after the small-diameter region 25 is housed in the hollow portion 7, the enlarged opening 13 is returned to its original state by the resilience of the thin-walled portion 14 of the bush body 9, and the restored opening 13 is closed by the narrow region 22 of the protruding portion 21. The second large-diameter region 27 prevents the pin shank 7 housed in the hollow portion 7 from being pulled out of the bush body 9 in an axial direction, and the beads 18 of the bush body 9 are fitted into the first grooves 33 formed in the small-diameter region 25 to allow the pin 2 to be kept in the non-fastened position relative to the bush 3. Simultaneously, the semi cylindrical portions 9A, 9B of the bush body 9 are returned to their original positions by the resilience of the thin-walled portion 14. The semi cylindrical portions 9A, 9B surround the rod portion 19 of the pin shank 5 to prevent the pin shank from being pulled out of the bush body 9 through the opening 13. This clip 1 pre-assembled in the non-fastened position can be used for coupling an attachment component to a workpiece.

With reference to FIGS. 13 to 17, an operation of coupling an attachment component 37, such as a functional component or a bracket, using the clip 1, to a workpiece 35, such as a panel of an automobile body, will be described below. In this example, an additional member 38, such as a reinforcing member, is fixedly attached to the workpiece 35 on the side of a rear surface thereof. A mounting hole 39 of the attachment component 37 has a diameter greater than that of a mounting hole 41 of the workpiece 35. Further, the diameter φD of the mounting hole 41 is set to be greater than the outer diameter "a" of the bush body 9.

Figure 13:
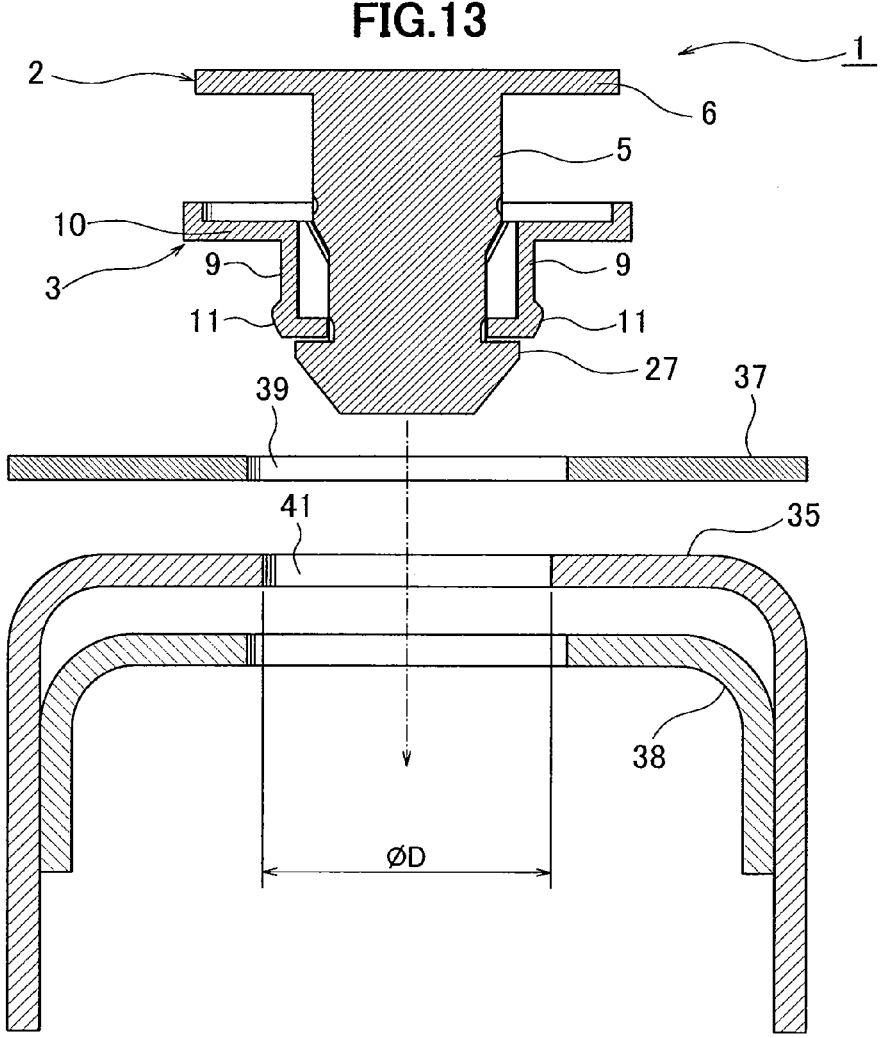
FIG. 13 is a sectional view showing a state before an attachment component is coupled to a workpiece, using the clip in FIG. 1.
Figure 13:
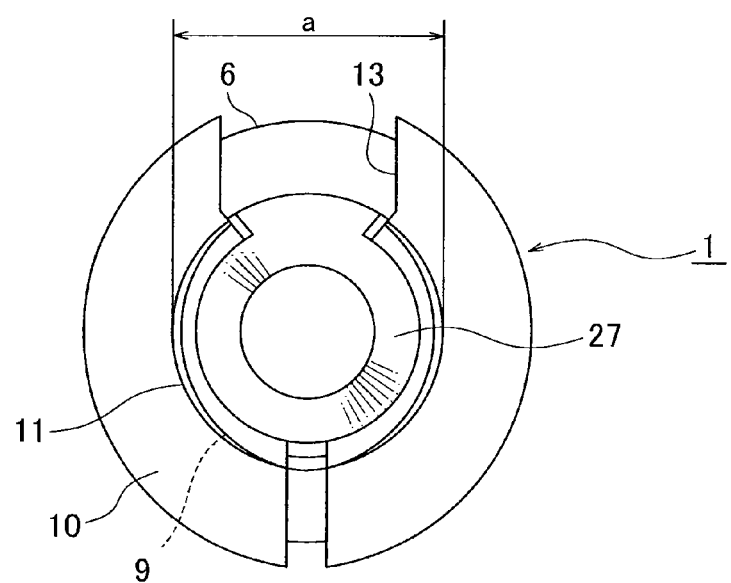
Figure 14:
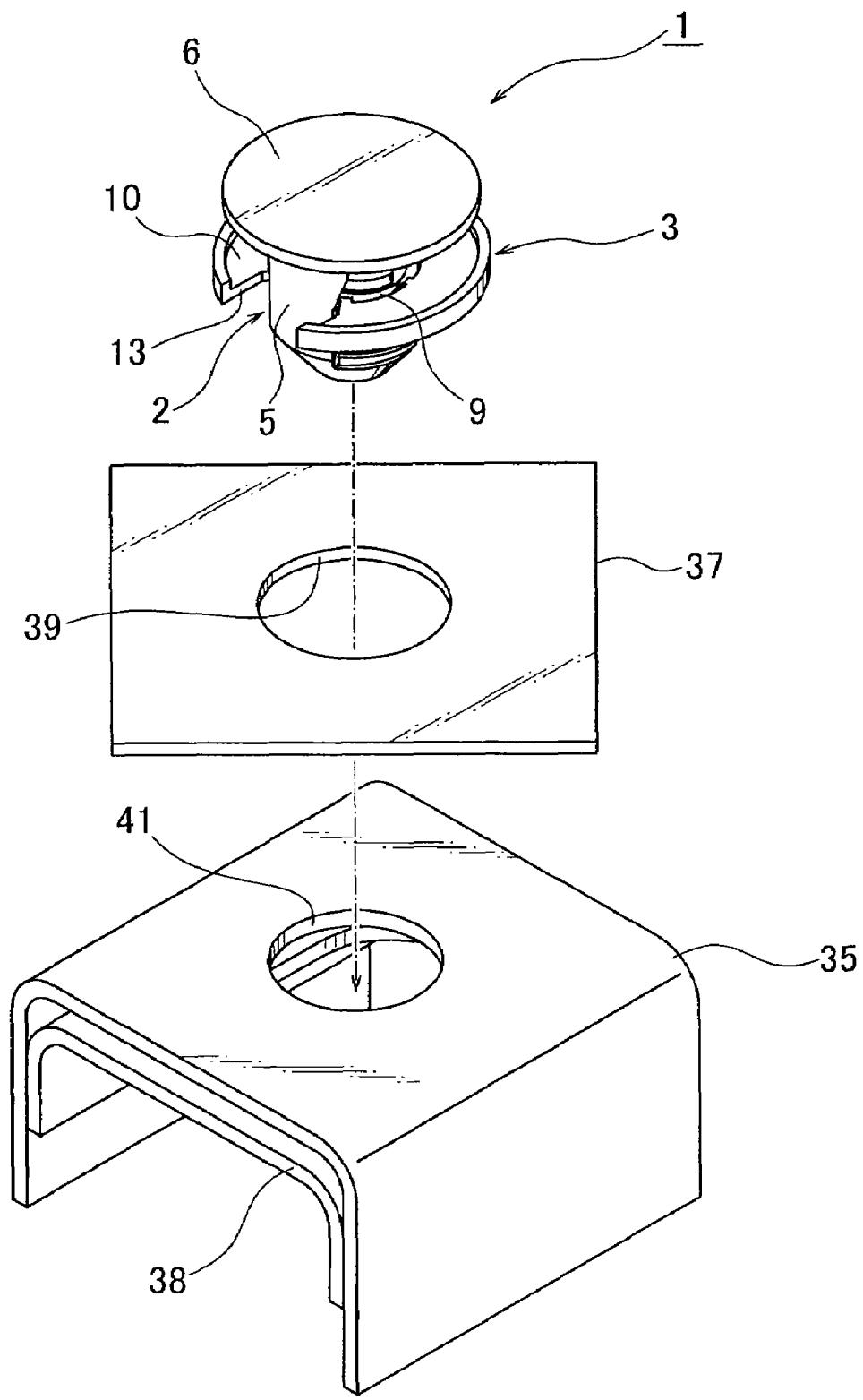
FIG. 14 is a perspective view showing the state before coupling, as shown in FIG. 13.

In FIGS. 13 and 14, an operator places the attachment component 37 onto the workpiece 35 while aligning the mounting hole 39 of the attachment component 37 with the mounting member 41 of the workpiece 35, and then inserts the pin shank 5 of the clip 1 into the mounting holes 39, 41, leading with the second large-diameter region 27. The diameter φD of the mounting hole 41 of the workpiece 35 is set to be greater than the outer diameter "a" of the engagement portion 11 of the bush body 9, so the bush body 9 is readily inserted through the mounting holes 39, 41. As mentioned above, the axial length of the bush body 9 is set to be greater than a total thickness of the workpiece 35 and the attachment component 37, and to extend less than a clearance between the workpiece 35 and the additional member 38. Thus, the bush body 9 is inserted into the attachment component 37 and the workpiece 35 without contact with the additional member 38. In this manner, the clip 1 is assembled to the workpiece 35 and the attachment component 37. The clip 1 is illustrated at the bottom of FIG. 13 only for the sake of facilitating the comparison of the diameter φD of the mounting hole 41 with the outer diameter "a" of the bush body 9.

Figure 15:
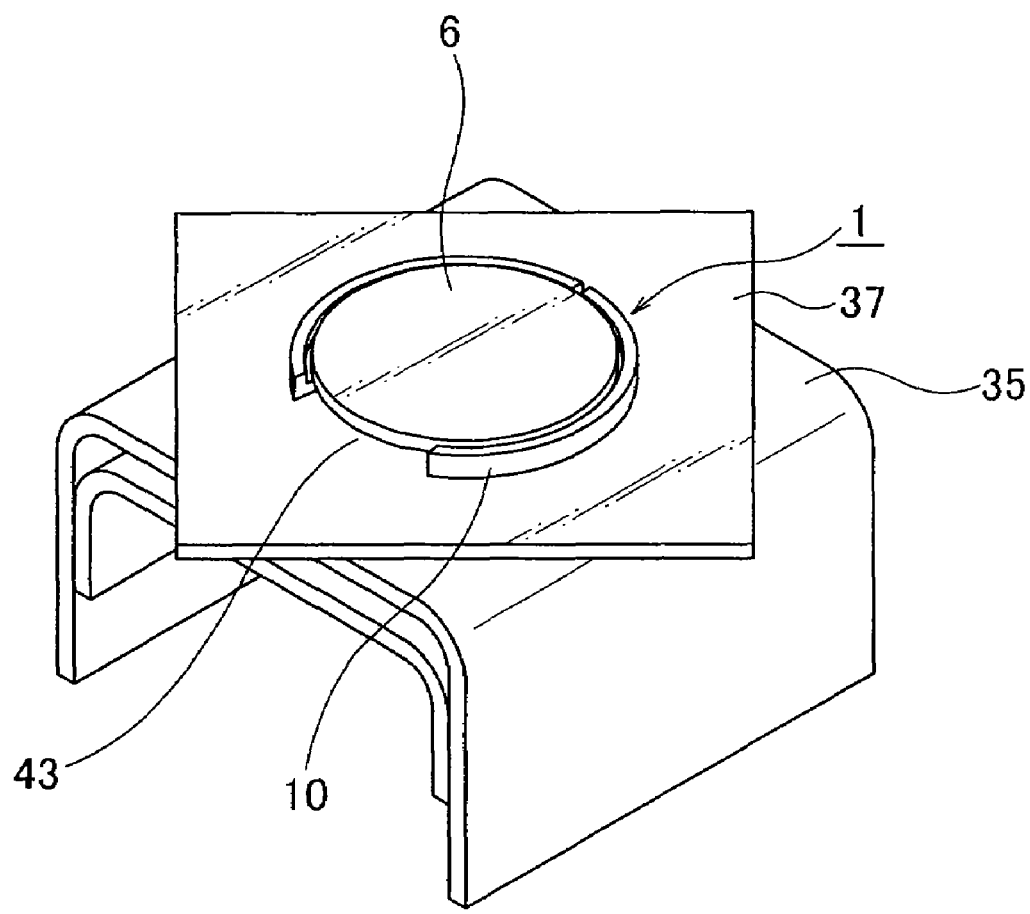
FIG. 15 is a perspective view showing a state after the attachment component is coupled to the workpiece, using the clip in FIG. 1.

As shown in FIG. 15, after or in the course of the operation of inserting the clip 1 into the attachment component 37 and the workpiece 35, the pin flange 6 is pushed toward the bush flange 10 to move the pin 2 from the non-fastened position to the fastened position. Through this operation, the attachment component 37 is coupled to the workpiece 35.

Figure 16:
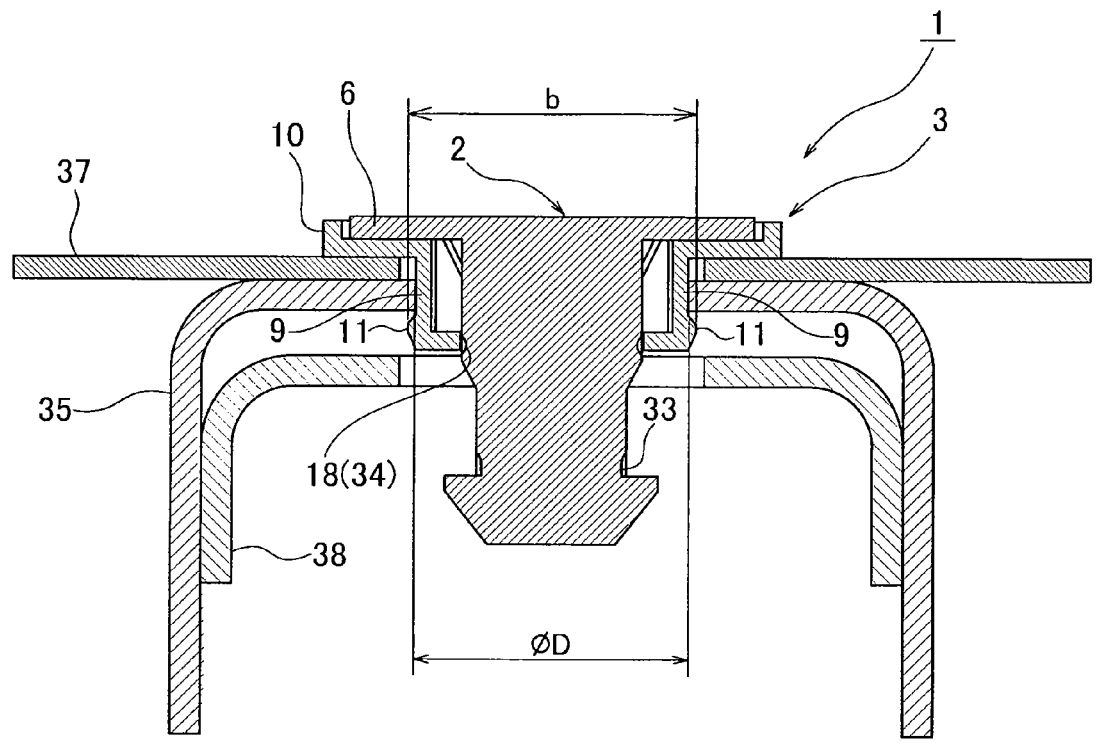
FIG. 16 is a sectional view showing the state after coupling, as shown in FIG. 15.
Figure 16:
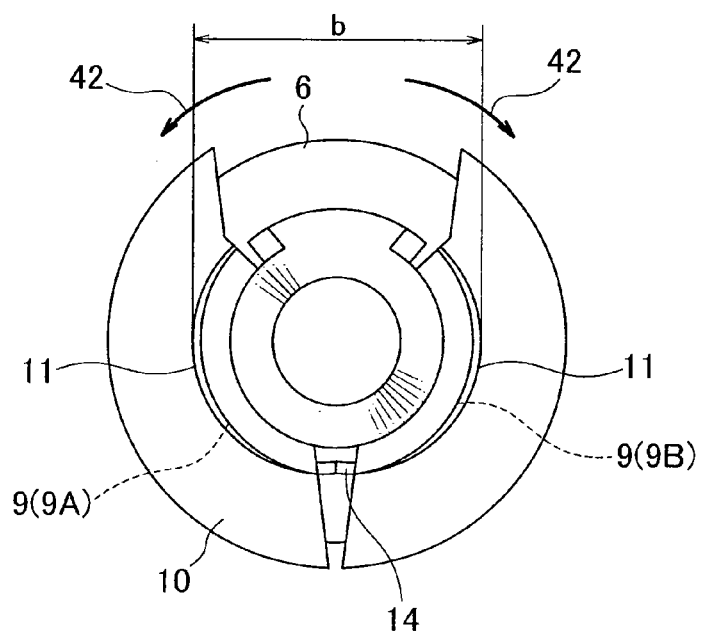
Figure 17:
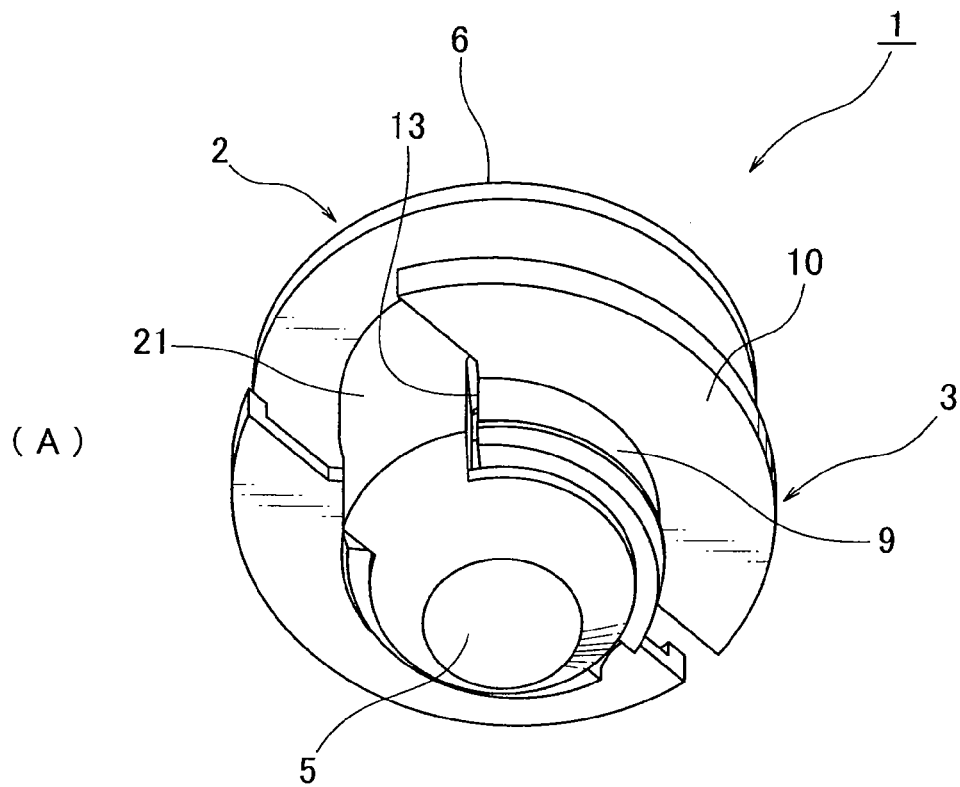
FIG. 17(A) is a perspective view showing a clip in a non-fastened position, as viewed from the bottom side of the clip.
FIG. 17(B) is a perspective view showing a clip in a fastened position, as viewed from the bottom side of the clip.
Figure 17:
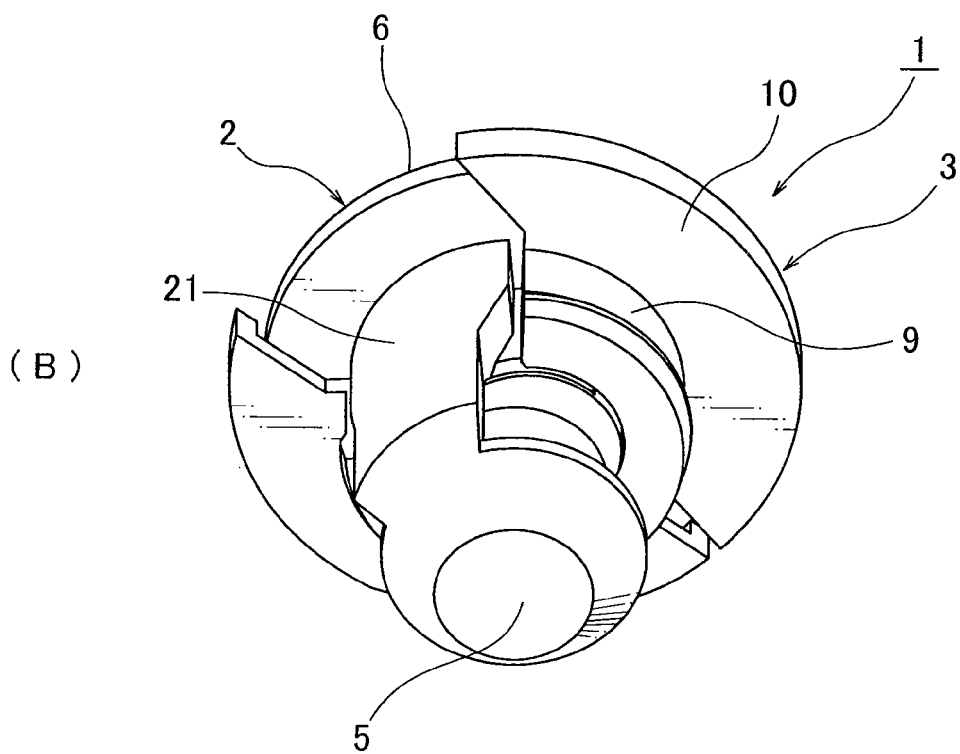

The following description will explain how the attachment component 37 is reliably coupled to the workpiece 35, with reference to FIGS. 16 and 17. When the pin 2 is moved to the fastened position relative to the bush by pushing the pin flange 6 toward the bush flange 10, the wide region 23 of the protruding portion 21 of the pin shank 5 is inserted into the opening 13 instead of the narrow region 22 and the taper region 29, and the first large-diameter region 26 of the rod portion is inserted into the hollow portion 7 instead of the small-diameter region 25 and the taper region 30. Thus, the opening 13 of the bush body 9 is enlarged, and the semi cylindrical portions 9A, 9B of the bush body 9 are moved in a radially outward direction, with the thin-walled portion 14 serving as a hinge. Consequently, the outer diameter of the entire bush body 9 is expanded in a radially outward direction, so that the engagement portion 11 at the lower distal end of the bush body 9 is expanded in a radially outward direction (indicated by the arrow 42 in FIG. 16) on the side of the rear surface of the workpiece 35 to have a diameter "b" greater than the diameter φD of the mounting hole 41.

FIG. 17(A) shows the clip 1 in the state when the pin 2 is in the non-fastened position relative to the bush 3, and FIG. 17(B) shows the clip 1 in the state when the pin 2 is in the fastened position after the operation of pushing the pin 2 into the bush 3. As shown in FIG. 17(B), in the clip 1 located in the fastened position, the outer diameter of the bush body 9 of the bush 3 is expanded. Thus, the attachment component 37 and the workpiece 35 are clamped between the bush flange 10 and the expanded engagement region 11, and coupled together.

The beads 18 formed on the inner surface of the bush body 9 of the bush 3 are fitted into the second grooves 34 of the first large-diameter region 26 of the pin shaft 5 of the pin 2 to keep the pin 2 in the fastened position, so as to reliably maintain the coupling between the attachment component 37 and the workpiece 35. Further, in the fastened position, the stop 31 formed on the first large-diameter region 26 of the rod portion 19 of the pin shank 5 come into contact with the ribs 17A adjacent to the opening 13 of the bush body 9 of the bush 3 to prevent the pin hank 5 from being pulled out of the bush body through the opening 13 in a radially outward direction, so as to further reliably maintain the coupling between the attachment component 37 and the workpiece 35, which is achieved by means of the expansion in the outer diameter of the entire bush body 9 in a radially outward direction. Thus, an entire longitudinal (i.e., axial) length of the bush 3 can be reduced while allowing an intended portion of the bush body 9 to be reliably expanded. Even in a situation where the fastened position has to be set in a narrow range in the longitudinal direction, for example, due to the additional member 38 located adjacent to the workpiece 35 with a relatively small clearance (e.g., 3 mm) therebetween, the attachment component 37 and the workpiece 35 can be reliably coupled together, using a bush body 9 having a relatively short axial length. The clip 1 makes it possible to reliably couple the attachment component 37 to the workpiece 35 with only a small allowable clearance on the rear side thereof.

In an operation of detaching the attachment component 37 from the workpiece 35 after the fastening (i.e., coupling) operation, a tip of an elongated member, such as a screwdriver, may be forcibly inserted into a space 43 illustrated in FIG. 15, and swingingly moved or rotated to allow the pin 2 to be pulled out of the bush 3, so as to move the pin 2 from the fastened position to the non-fastened position. The pin flange 6 is formed in a size entirely overlapping with the bush flange 10, and the pin flange 6 is located adjacent to the bush flange 10 when the pin 2 is in the fastened position, to define the space 43 therebetween at a position corresponding to the opening 13. Thus, the elongated member can be forcibly inserted into a space 43 and moved to allow the pin flange 6 to be moved away from the bush flange 10, so as to move the pin 2 to the non-fastened position relative to the bush 3. Through this operation, the clip 1 can be unfastened from the workpiece 35 and the attachment component 37. After the operation of unfastening the clip 2, the attachment component 37 can be detached from the workpiece 35. In this manner, the detachment operation can be readily performed.

While a preferred embodiment of the invention has been shown and described, it will be apparent that changes can be made without departing from the principles and spirit of the invention, the scope of which is defined in the claims which follow.

What is claimed is:

1. A plastic clip comprising a pin, and a bush having a hollow portion formed to receive the pin therein,
   wherein the pin has a flange and has a shank adapted to be received into the hollow portion of the bush in a non-fastened position, causing no expansion in an outer diameter of the bush, and then to be moved from the non-fastened position, to a fastened position causing an expansion in the outer diameter of the bush, by pushing the pin in an axial direction of the bush;
   wherein the bush has a flange and has a generally annular-shaped bush body having the hollow portion formed to receive the pin shank therein;
   wherein the pin and the bush are adapted to be pre-assembled to one another with the pin shank housed in the bush body;
   wherein the bush body and the bush flange have an opening in a peripheral wall thereof and adapted to receive therein the pin shank in a direction orthogonal to an axial direction of the bush body;
   wherein a thin-walled portion is formed in the bush body at a position opposed to the opening in a circumferential direction of the bush body;
   wherein the bush body has two rigid semi cylindrical portions on opposite sides of the thin-walled portion in the circumferential direction, respectively;
   wherein two semicircular discs at first ends of the semi cylindrical portions, respectively, serve as the bush flange;
   wherein the pin shank has a rod portion adapted to be housed in the hollow portion of the bush body and held within the bush body after the pin is pre-assembled to the bush, and a protruding portion is formed on an outer peripheral surface of the rod portion so as to extend in a longitudinal direction of the rod portion, and to protrude in a radially outward direction of the bush body to close the opening when the pin is pre-assembled to the bush, the protruding portion including a narrow region near a distal end of the pin shank remote from the pin flange and having a first, relatively small circumferential length, and adapted to close the opening in such a manner as to cause no expansion in an outer diameter of the bush body when the pin is in the non-fastened position, and a wide region adjacent to the bush flange and having a second, relatively-large circumferential length, and adapted to close the opening when the outer diameter of the bush body is expanded with the pin in the fastened position.

2. The clip as defined in claim 1, wherein the thin-walled portion has flexibility for serving as a hinge to allow the semi cylindrical portions to be swingingly moved in a radially outward direction during the expansion in the outer diameter of the bush body, and resilience for maintaining the bush body without an expansion in the outer diameter thereof when the pin is in the non-fastened position.

3. The clip as defined in claim 1, wherein the rod portion of the pin shank includes:
- a small-diameter region near the distal end of the pin shank in corresponding relation to the narrow region of the protruding portion, and adapted to be housed in the hollow portion of the bush body in such a manner as to cause no expansion in the outer diameter of the bush body when the pin is in the non-fastened position;
- a first large-diameter region adjacent to the bush flange in corresponding relation to the wide region of the protruding portion, adapted to cause an expansion in the outer diameter of the bush body when the pin is in the fastened position; and
- a second large-diameter region near the distal end of the pin shank and having a diameter greater than an inner diameter of the bush body when the pin is in the non-fastened position, and adapted to prevent the pin from being pulled out of the bush body when the small-diameter region is housed in the hollow portion.

4. The clip as defined in claim 3, wherein the protruding portion of the pin shank has a taper region which extends from the narrow region to the wide region while gradually increasing a circumferential length thereof from the first circumferential length to the second circumferential length; and the rod portion has a taper region which extends from the small-diameter region to the first large-diameter region while gradually increasing a diameter thereof.

5. The clip as defined in claim 3, which includes stop means between an outer surface of the first large-diameter region of the rod portion of the pin shank and an inner surface of the bush body, and adapted to prevent the pin shank from being pulled out of the bush body in a radially outward direction when the pin is in the fastened position so as to keep the pin in the fastened position.

6. The clip as defined in claim 1, which includes first and second latch means provided between an outer surface of the pin shank and an inner surface of the bush body, the first latch means being adapted to keep the pin in the non-fastened position, the second latch means being adapted to keep the pin in the fastened position.

7. The clip as defined in claim 1, wherein the bush body has an engagement portion near the distal end thereof protruding in a radially outward direction and adapted to be engaged with a peripheral edge defining a mounting hole of a workpiece to which the clip is fastened.

8. The clip as defined in claim 1, which is constructed to couple an attachment component to a workpiece, with the bush body inserted into respective aligned mounting holes of the attachment component and the workpiece, and the pin shank moved from the non-fastened position to the fastened position by pushing the pin, to expand the outer diameter of the bush body so as to allow the attachment component and the workpiece to be clamped between the expanded bush body and the bush flange.

9. The clip as defined in claim 8, wherein the bush body has an axial length which is greater than a total thickness of the attachment component and the workpiece, and extends less than a clearance between the workpiece and an additional member coupled to the workpiece on an opposite side of the attachment component.

10. The clip as defined in claim 1, wherein the pin flange has an outer diameter slightly less than that of the bush flange so as to entirely overlap the bush flange, wherein the clip is constructed to position the pin flange adjacent to the bush flange when the pin is in the fastened position, and to allow an elongated member to be inserted into the opening so as to separate the pin flange from the bush flange in order to move the pin to the non-fastened position.

* * * * *